Jan. 1, 1929.  1,697,681

J. B. DÁVILA

RESILIENT WHEEL

Filed Feb. 23, 1927

INVENTOR
Juan B. Davila
BY
ATTORNEY

Patented Jan. 1, 1929.

1,697,681

UNITED STATES PATENT OFFICE.

JUAN B. DÁVILA, OF NEW YORK, N. Y.

RESILIENT WHEEL.

Application filed February 23, 1927. Serial No. 170,153.

This invention relates generally to vehicle wheels, and has more particular reference to resilient wheels of a non-pnuematic type in which there is no possibility of puncture.

The invention has for an object the provision of a novel type of resilient wheel which will act very efficiently, and which can be manufactured and sold at a reasonable cost.

For further comprehension of the invention and of the objects and advantages thereof, reference will be had to the following description and accompanying drawing, and to the appended claims in which the various novel features of the invention are more particularly set forth.

Referring to the drawing forming a material part of the disclosure:

Figure 1:
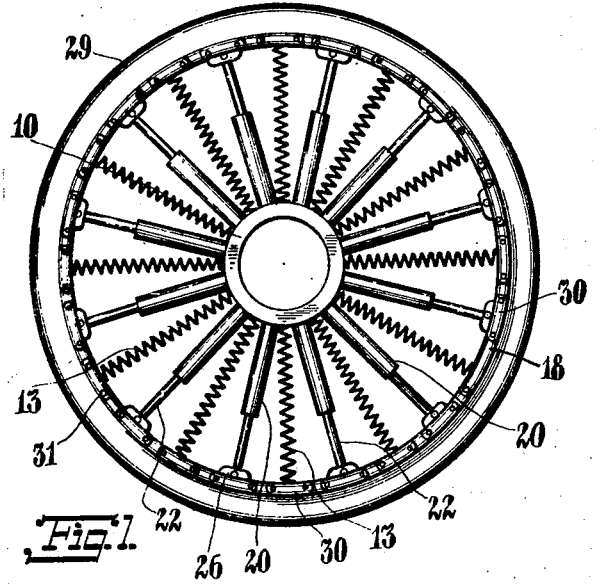
Fig. 1 is a face view of a wheel constructed according to this invention.
Figure 3:
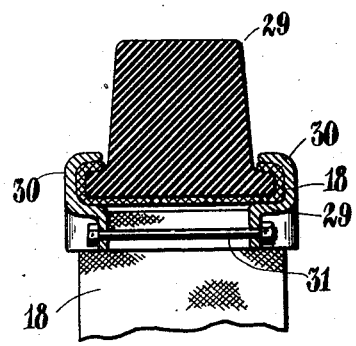
Fig. 3 is a transverse sectional view taken on the line of Fig. 2.
Figure 2:
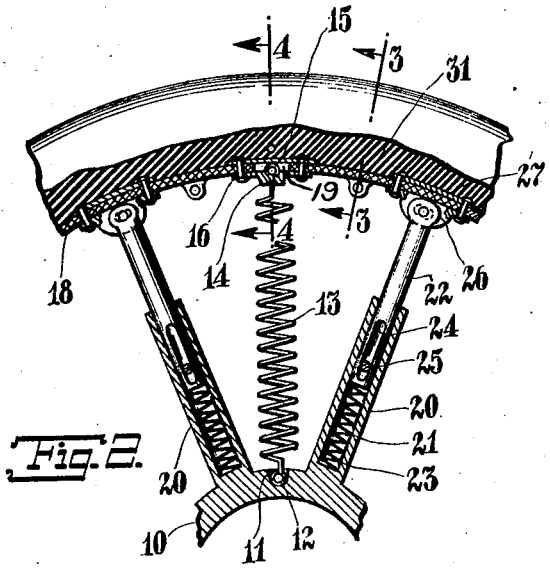
Fig. 2 is an enlarged fragmentary longitudinal sectional view thereof.
Figure 4:
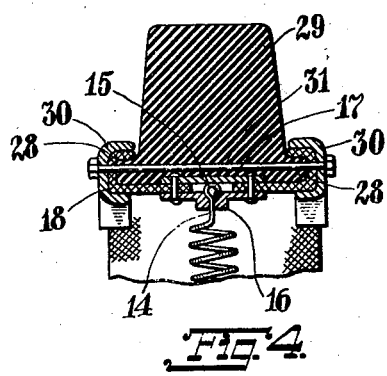
Fig. 4 is a transverse sectional view, taken on the line 4—4 of Fig. 2.

The reference numeral 10 indicates generally the hub of a wheel having a plurality of small recesses 11 in which pins 12 are secured. The pins 12 engage the inner ends of expansion springs 13 formed at the outer ends with straight portions 14 and hooked end extremities 15. Washers 16 are engaged on the straight portions 14 and are riveted, or screwed to other washers 17, clamping therebetween a holding member 18 formed by a plurality of layers of wire screen material, and having apertures 19 to accommodate the hooked end extremities 15 of the expansion springs 13. Projecting from the hub 10 and straddling the springs 13 are posts 20 formed with central bores 21 in which rods 22 slidably engage. Compression springs 23 housed in the bores 21 act against the inner ends of the rods 22 urging the rods outwards, the rods being formed with elongated apertures 24 in which pins 25 secured to the posts 20, engage, and limit the possible moton of the rods. The outer ends of these rods are pivotally secured to plates 26 in elongated apertures, which plates 26 are riveted or screwed to other plates 27 and these plates 26, 27 engage on opposite sides of the holding member 18.

The edges of the holding member 18 are turned around the feet 28 of the solid rubber, or other material tire 29, and a plurality of metallic clamping members 30 engage over these edges, while bolts 31 or the like, pass through the clamping members 30 of one side to the members 30 on the other side.

Figure 5:
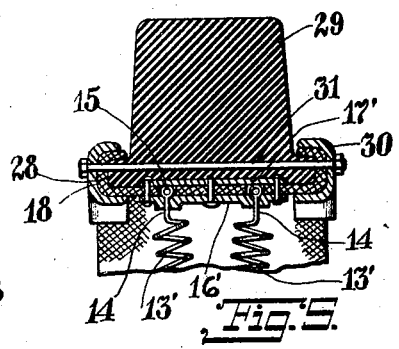
Fig. 5 is a view similar to that shown in Fig. 4 but of a modified form of the invention.

In the modification shown in Fig. 5, a pair of springs 13' are used, and plates 16' and 17' engage the outer ends of these springs, similar to the manner in which the plates 16 and 17 engaged the springs 13.

Figure 6:
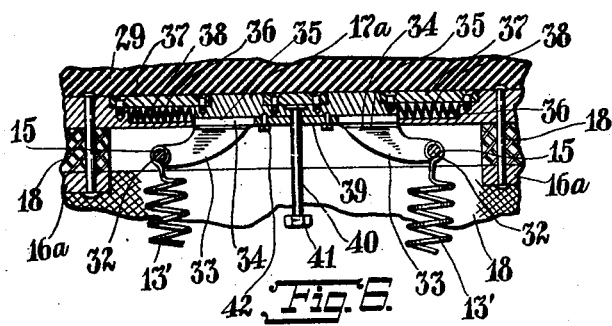
Fig. 6 is an enlarged fragmentary view similar to Fig. 5, but showing another modification of the invention.

In the modification shown in Fig. 6, the distance between the outer ends of springs 13' may be varied. The hook ends 15 of the springs 13', engage the shanks 32 of slides 33 formed with dove-tailed portions 34 engaged in dove-tailed grooves 35 in plates 17$^a$. Recesses 36, accessible by covers 37 are provided with compression springs 38, acting against the slides 33, normally urging the slides against a cam 39 on a shaft 40 rotatable in the plate 17$^a$, and having a head 41 for manual operation. Set screws 42 engage in the cam 39 and abut against the plate 17$^a$ to lock the cam in adjusted posttions. The plates 16$^a$ are connected to plates 17$^a$ by rivets, or the like, and the holding member 18 is clamped therebetween.

In operation, shocks and bumps received on the tire 29 are very poorly transmitted to the hub 10, since springs 13 and 21 act as cushions. The posts 20 and the rods 22 act to stiffen the wheel sideways, without subtracting from the cushioning of the springs. Besides two springs allow a wider range of design possibilities as far as flexibility is concerned. In the modification shown in Fig. 6, the set screws 42 may be loosened, head 41 turned to turn the cam 39, and the springs 38 act to move the slides 33 as allowed by the cam 39. This changes the distance between the outer ends of springs 13' and since the inner ends of the springs are not moved, the angles of the springs to the vertical changes, and therefore the cushioning effect changes, since now a different resultant force of the springs acts in the cushioning direction.

While I have illustrated and described my invention with some degree of particularity, I realize that in practice various alterations therein may be made. I therefore reserve the right and privilege of changing the details of construction or altering the arrangement of the correlated parts without departing from the spirit or the scope of the appended claims.

Having thus described my invention, what I claim as new and desire to secure by United States Letters Patent is:

1. A vehicle wheel, comprising a hub, a tire of resilient material, a holding member formed of wire screen material properly secured to the tire, springs connected between the hub and holding member, and means adapted to stiffen the wheel sideways without subtracting from the cushioning effect of the springs.

2. A vehicle wheel, comprising a hub, a tire of resilient material, springs connected between the hub and tire, means for moving the outer ends of the springs in relation to a certain adjacent spring, consisting of shanks engaging the outer ends of the springs, slides on the shanks, dove-tailed portions on the slides, plates formed with dove-tailed grooves for the dove-tailed portions, cams on said plates, and means for urging the slides against the cams, and means adapted to stiffen the wheel sideways without subtracting from the cushioning effect of the springs.

3. A vehicle wheel comprising a hub, a tire comprising resilient material substantially concentric with said hub, a holding member formed of wire net work secured to said tire, spaced apart, sets of clamping members mounted on said holding member, each clamping member of one set being arranged alternately with respect to the clamping members of the other set, springs disposed between said hub and tire each attached at their outer ends to one set of clamping members, and means adapted to stiffen the wheel sideways without subtracting from the cushioning effect of the springs comprising extensible spoke elements attached at their outer ends to the other set of clamping members.

4. A vehicle wheel of the class described comprising a hub, a tire of resilient material disposed concentrically relative to said hub comprising inner peripheral edge flanges, a holding member comprising wire netting mounted on the inner periphery of said tire and disposed at its edges around the peripheral edge flanges thereof, spaced apart clamping members for securing said holding members to said tire, springs connected between the hub and holding member, and means adapted to stiffen the wheel sideways without subtracting from the cushioning effect of the spring.

5. A vehicle wheel comprising a hub, a tire comprising resilient material disposed concentrically of said hub, springs attached at their inner ends to said hub and at their outer ends to said tire, additional means disposed between said tire and said hub for retaining the same in spaced relation, and adjustable brackets slidably supported on the inner periphery of said tire and attached to the outer ends of said springs adapted to be adjustably positioned for varying the tension of the latter.

6. A vehicle wheel comprising a hub, a tire comprising resilient material disposed concentrically of said hub, a holding member comprising a wire netting mounted on the inner periphery of said tire, clamping members comprising inner and outer plates disposed on opposite side of said wire netting, bolts securing said plates to said netting, and spring members each attached at one end to one of said clamping members and at its other end to said hub for retaining the latter and said tire in spaced relation.

In testimony whereof I have affixed my signature.

JUAN B. DÁVILA.